United States Patent
Kim et al.

(10) Patent No.: US 7,301,725 B2
(45) Date of Patent: Nov. 27, 2007

(54) DISK DRIVE WITH COVER PLATE HAVING HIGH STIFFNESS

(75) Inventors: Tae-Soo Kim, Suwon-si (KR);
Chul-Woo Lee, Seongnam-si (KR);
Ki-Tag Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 10/919,066

(22) Filed: Aug. 16, 2004

(65) Prior Publication Data
US 2005/0041327 A1  Feb. 24, 2005

(30) Foreign Application Priority Data
Aug. 21, 2003  (KR)  ....................... 10-2003-0058004

(51) Int. Cl.
*G11B 5/12* (2006.01)
*G11B 17/00* (2006.01)
*G11B 23/03* (2006.01)

(52) U.S. Cl. ................... 360/97.01; 360/97.02; 464/170; 464/173

(58) Field of Classification Search ... 360/97.01–97.02
See application file for complete search history.

(56) References Cited
U.S. PATENT DOCUMENTS
5,559,650 A * 9/1996 Repphun et al. ......... 360/97.02

2006/0146440 A1 * 7/2006 Morioka .................. 360/97.01

OTHER PUBLICATIONS

English Machine Translation of JP 09053434 A.*
English Machine Translation of JP 07244979 A.*
Japanese Patent Application No. 11-216797 to Kazuyuki et al, having Publication date of Feb. 16, 2001 (w/ English Abstract page).
Japanese Patent Application No. 06-065491 to Tomoshi, having Publication date of Sep. 19, 1995 (w/ English Abstract page).
Japanese Patent Application No. 07-207128 to Takeshi, having Publication date of Feb. 25, 1997 (w/ English Abstract page).
Japanese Patent Application No. 2000-114092 to Valentine, having Publication date of Nov. 7, 2000 (w/ English Abstract page).

* cited by examiner

*Primary Examiner*—Angel Castro
*Assistant Examiner*—Christopher R. Magee
(74) *Attorney, Agent, or Firm*—Monica H. Choi (57) ABSTRACT

A disk drive comprises a cover plate with preload tension formed across the cover plate for increasing the stiffness of the cover plate. The preload tension is formed across the cover plate after the cover plate that was warped is secured to a base member of the disk drive to become un-warped. Such a cover plate with increased stiffness is not easily deformed and effectively minimizes propagation of noise generated from operation of the disk drive.

16 Claims, 6 Drawing Sheets

DISK DRIVE WITH COVER PLATE HAVING HIGH STIFFNESS

BACKGROUND OF THE INVENTION

This application claims priority to Korean Patent Application No. 2003-0058004, filed on Aug. 21, 2003, in the Korean Intellectual Property Office, the disclosure of which is incorporated herein in its entirety by reference.

1. Field of the Invention

The present invention relates generally to disk drives, and more particularly, to a disk drive having a cover plate formed with preload tension across the cover plate for higher stiffness.

2. Description of the Related Art

Hard disk drives (HDDs), as data storage devices for computers, use read/write heads to reproduce data from or record data on a disk. The read/write head performs such read/write functions by being moved by an actuator to a desired position while being lifted over the disk.

Figure 1:
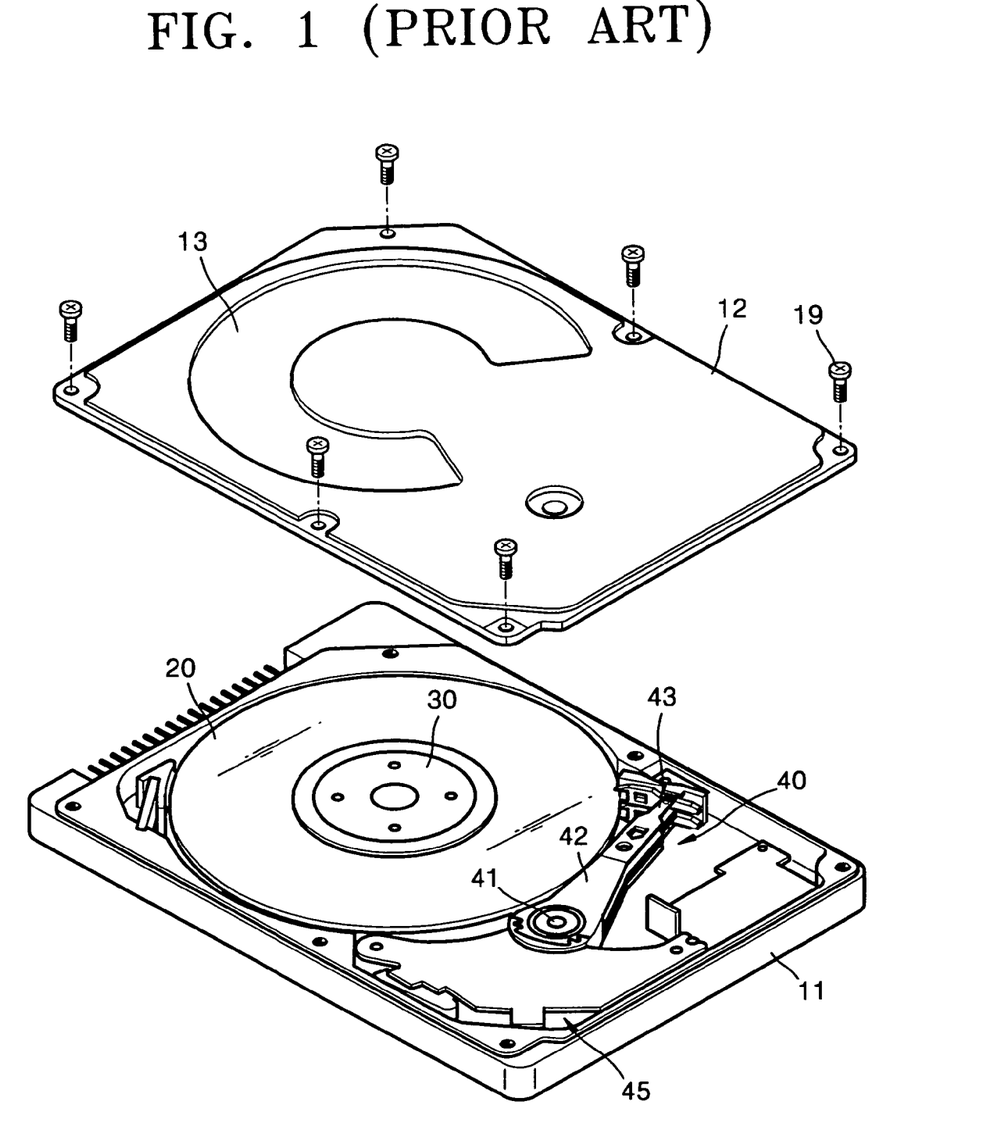
FIG. 1 shows an exploded perspective view of a conventional hard disk drive.

FIG. 1 shows an exploded perspective view of a conventional hard disk drive. Referring to FIG. 1, a conventional hard disk drive includes a base member 11. A spindle motor 30 for rotating a disk 20 and an actuator 40 for moving a read/write head over the disk 20 are installed on the base member 11.

The actuator 40 includes a swing arm 42 rotatably coupled to a pivot bearing 41 installed on the base member 11. The actuator 40 also includes a suspension 43 installed at one end portion of the swing arm 42. The suspension 43 supports a slider having the head mounted thereon as the head is moved over a surface of the disk 20. A voice coil motor (VCM) 45 is controlled by a servo control system to rotate the swing arm 42 from interaction between a current applied to a VCM coil and a magnetic field generated by a magnet.

When power is applied to the hard disk drive, the disk 20 rotates, and the voice coil motor 45 rotates the swing arm 42 counterclockwise to move the head toward a position above a recording surface of the disk 20. When power is no longer applied to the hard disk drive, the disk 20 stops rotating, and the voice coil motor 45 rotates the swing arm 42 clockwise to move the head away from the disk 20.

Further referring to FIG. 1, a cover plate 12 is assembled to the base member 11 by using a plurality of screws 19. The cover plate 12 is desired to enclose and thus protect the disk 20 and the actuator 40 by keeping away dust and moisture from such disk drive components. Furthermore, the cover plate 12 is desired to minimize propagation of noise from operation of the disk drive.

In the disk drive of the prior art however, the cover plate 12 is typically manufactured into a flat shape by press-processing a thin stainless steel plate. The base member 11 is mainly manufactured of aluminum or an aluminum alloy by die-casting. With such a cover plate 12 of the prior art, the thickness of the cover plate 12 is much thinner than that of the base member 11. Thus, the cover plate 12 is not stiff enough, and as a result, a lot of vibrations and noise are generated from the disk drive during operation.

In addition, the size of the modern disk drive is desired to be further decreased to be more compact and slim. Thus, the distance between the components of the disk drive such as between the cover plate 12 and each of the disk 20, the spindle motor 30, and the actuator 40, decreases. The cover plate 12 which is not stiff enough deforms easily from external impact or load. Such a deformed cover plate 12 may contact the enclosed disk drive components resulting in interference with their operations or even damage of such components.

For example, disk drives used for portable computers such as notebook computers have limited height and weight. Thus, the thickness of the cover plate 12 is very thin, such as in a range of 0.4 mm to 0.5 mm for example. Such a thin cover plate 12 formed without sufficient stiffness is easily deformed.

Conventionally, to address such problems, a groove 13 and/or reinforcement ribs of various shapes are formed on the cover plate 12 to increase stiffness of the cover plate 12. However, such prior art techniques fail to result in sufficient stiffness for the cover plate 12.

Thus, a cover plate is desired to be formed with sufficient stiffness to protect disk drive components and to reduce noise of the disk drive, without being easily deformed.

SUMMARY OF THE INVENTION

Accordingly, in a general aspect of the present invention, a disk drive comprises a cover plate with preload tension formed across the cover plate for increasing the stiffness of the cover plate.

In one embodiment of the present invention, a disk drive includes a base member and a cover plate secured to the base member with preload tension formed across the cover plate. The preload tension is formed across the cover plate after the cover plate that was warped is secured to the base member to become un-warped.

In another embodiment of the present invention, the cover plate encloses disk drive components, such as a spindle motor for rotating a disk and an actuator for moving a read/write head over the disk, formed on the base member.

In a further embodiment, a groove is formed on the cover plate to further increase the stiffness of the cover plate.

In an example embodiment, the preload tension formed across the cover plate results from the cover plate having a twisted shape before being secured to the base member. In that case, the cover plate has a substantially flat shape after being secured to the base member.

In another example embodiment, the preload force of the cover plate results from the cover plate being warped in one direction before being secured to the base member.

In an example embodiment for warping the cover plate, the cover plate is formed into a flat shape by press-processing a metal plate. Thereafter, the flat cover plate is plastically warped into the warped shape.

In another example embodiment for warping the cover plate, a metal plate is press-processed to form the cover plate with the warped shape.

The cover plate of the present invention is advantageously applied for a HDD (hard disk drive). However, the cover plate of the present invention may be applied within any other types of disk drives.

In this manner, the preload tension formed across the cover plate increases the stiffness of the cover plate secured to the base member of the disk drive. Thus, such a cover plate is not easily deformed to more effectively protect the enclosed disk drive components, even when the cover plate is relatively thin and even with reduced dimensions of the disk drive. In addition, the cover plate with higher stiffness more effectively minimizes propagation of noise from the disk drive.

BRIEF DESCRIPTION OF THE DRAWINGS

The above and other features and advantages of the present invention will become more apparent when described in detailed embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, and 8 refer to elements having similar structure and/or function.

DETAILED DESCRIPTION OF THE INVENTION

Figure 2:
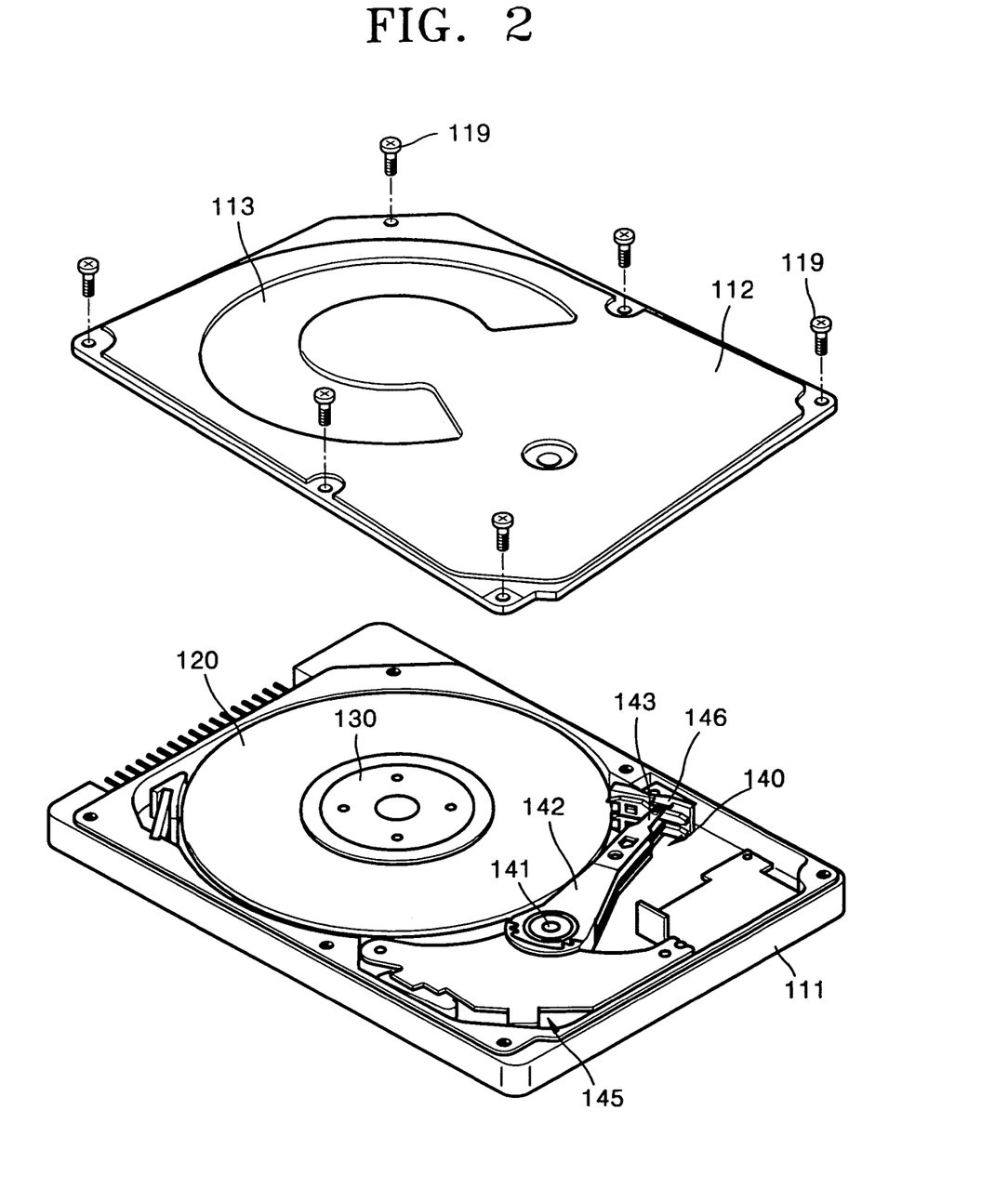
FIG. 2 shows an exploded perspective view of a disk drive including a cover plate to be formed with high stiffness, according to an embodiment of the present invention.
Figure 3:
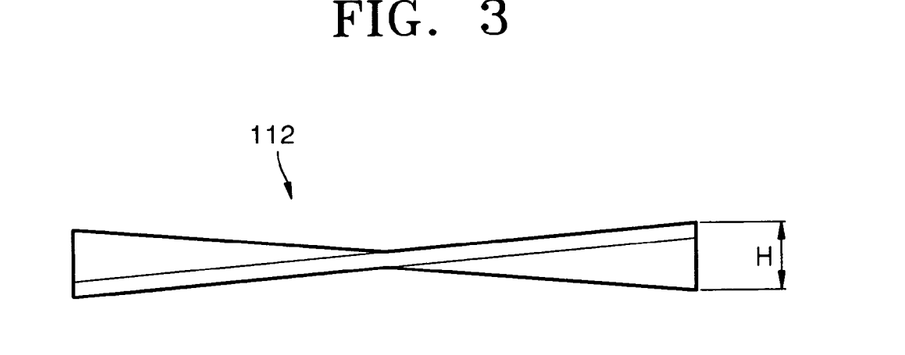
FIG. 3 shows a side view of the cover plate of FIG. 2, according to an embodiment of the present invention.

Referring to FIGS. 2 and 3, a disk drive according to an embodiment of the present invention includes a base member 111, a spindle motor 130 to rotate a disk 120, an actuator 140, and a cover plate 112 to be assembled with high stiffness.

The base member 111 is typically manufactured of aluminum or an aluminum alloy by die-casting. A space to accommodate the disk 120, the spindle motor 130, and the actuator 140 is formed on an upper surface of the base member 111. The spindle motor 130 is installed on the base member 111. At least one disk 120 is installed on a hub of the spindle motor 130 and is rotated with the hub.

The actuator 140 includes a swing arm 142, a suspension 143, and a voice coil motor (VCM) 145, to move a read/write head over the disk 120 when recording and reproducing data. The swing arm 142 is rotatably coupled to a pivot bearing 141 on the base member 111. The suspension 143 is coupled to a leading end portion of the swing arm 142 and supports a slider having the head mounted thereon.

The voice coil motor 145 is controlled by a servo control system for rotating the swing arm 142 over the disk 120 from interaction between a current applied to a VCM coil and a magnetic field generated by a magnet. When power is applied to the hard disk drive, the disk 120 starts to rotate, and the voice coil motor 145 rotates the swing arm 142 counterclockwise to move the head over a recording surface of the disk 120. When power is no longer applied on the hard disk drive, the disk 120 stops rotating, and the voice coil motor 145 rotates the swing arm 142 clockwise to move the head away from the disk 120. The head that is moved away from the recording surface of the disk 120 is typically parked on a ramp 146 disposed outside of the disk 120.

The cover plate 112 is assembled to an upper portion of the base member 111 to enclose disk drive components such as the disk 120, the spindle motor 130, and the actuator 140. The cover plate protects such disk drive components by keeping away dust and moisture from the disk drive components. Furthermore, the cover plate 112 minimizes propagation of noise generated from operation of the disk drive.

In an example embodiment of the present invention, a groove 113 is formed on the cover plate 112. The groove 113 decreases the distance between the disk 120 and the cover plate 112 to reduce vibrations of the disk 120. Also, the groove 113 further increases stiffness of the cover plate 112. However, the present invention may be generally practiced with or without the groove 113 formed on the cover plate.

In a general aspect of the present invention, before being secured to the base member 111, the cover plate 112 has a warped shape instead of a flat shape. The cover plate 112 is manufactured to have a body with a warped shape, and the warped body of the cover plate is then secured to the base member 111 of the disk drive. In an example embodiment of the present invention, as shown in FIGS. 2 and 3, the cover plate 112 is manufactured to have a twisted shape. The level of twisting of the body of the cover plate 112 is indicated by the twisted height H, and such a level of twisting is adjusted according to the size and thickness of the cover plate 112.

In an example embodiment, the cover plate 112 is manufactured from a metal plate having a high stiffness and a predetermined elasticity, such as a stainless steel plate for example. The cover plate 112 having the above twisted shape is manufactured according to the following method, in one embodiment of the present invention.

First, the cover plate 112 is manufactured by press-processing a metal plate, such as a stainless steel plate for example, into the twisted shape. In further detail, a surface of a press mold is formed into a twisted shape corresponding to the desired twisted shape of the cover plate 112. Thus, the cover plate 112 having the desired twisted shape is manufactured by press-processing the metal plate with such a press mold. The cover plate 112 has the desired twisted shape simply after the press-processing. However, manufacturing of the press mold with the corresponding twisted shape is difficult.

Thus, in an alternative embodiment of the present invention, the cover plate 112 is manufactured by press-processing a metal plate, such as a stainless steel plate for example, into a flat shape. Thereafter, the flat cover plate is plastically warped into the twisted shape. In further detail, the stainless steel plate which is initially press-processed into a flat shape is warped into the twisted shape by using a jig having a predetermined shape.

For such warping, the stainless steel plate is heated up from room temperature to a predetermined temperature during such warping. Thus, the cover plate retains the twisted shape after being cooled to room temperature. In this manner, the stainless steel plate is plastically warped into the twisted shape without being recovered to the initial flat shape. In this example embodiment, although the manufacturing steps are relatively more complicated, the manufacturing of the press mold is easier since the surface of the press mold is flat.

Figure 4:
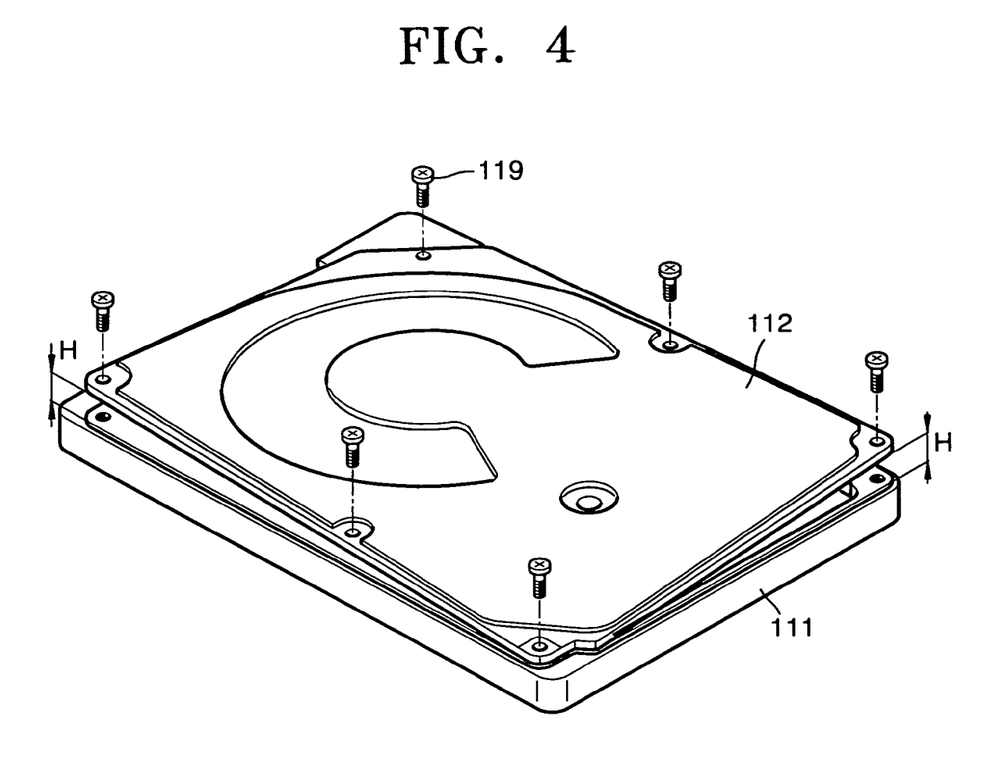
FIG. 4 shows a perspective view of the disk drive of FIG. 2 as the cover plate is assembled to a base member of the disk drive, according to an embodiment of the present invention.
Figure 5:
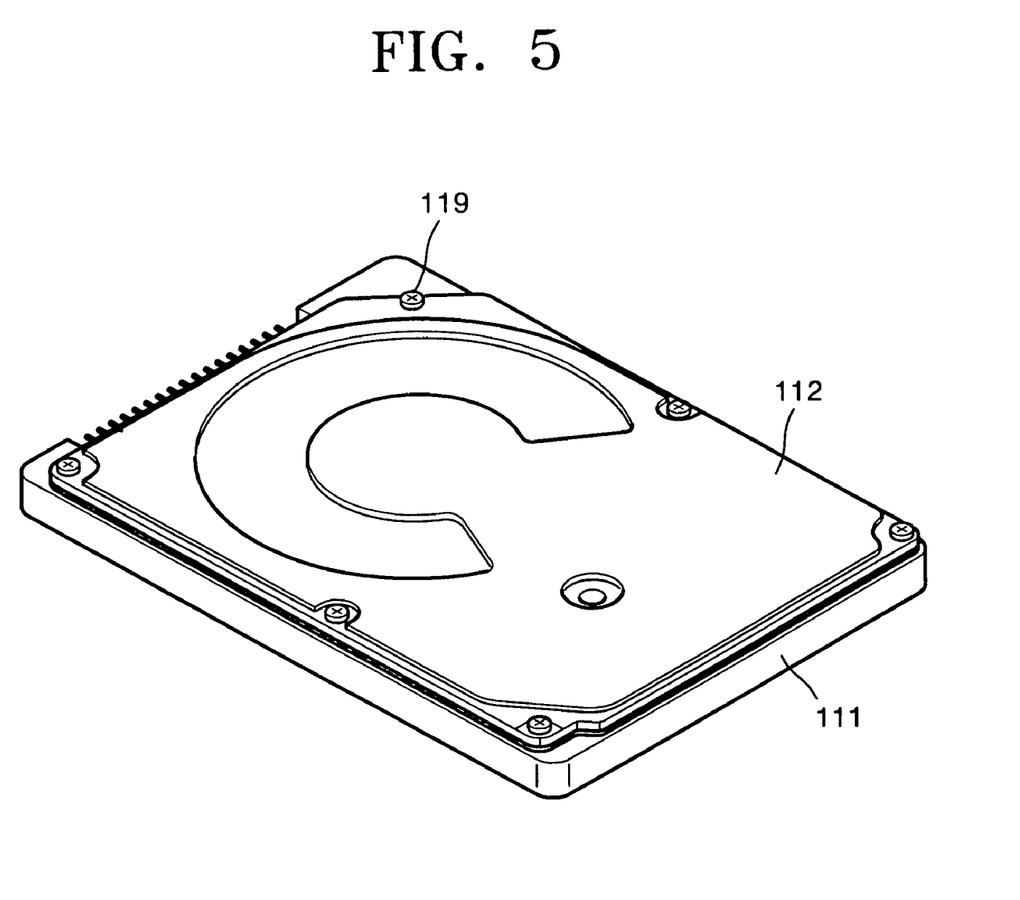
FIG. 5 shows a perspective view of the disk drive of FIG. 2 after the cover plate is assembled to the base member, according to an embodiment of the present invention.

FIG. 4 shows a perspective view of the disk drive before the cover plate 112 of FIG. 2 is assembled to the base member 111. FIG. 5 shows a perspective view of the disk drive after the cover plate 112 of FIG. 2 is assembled to the base member 111.

Referring to FIG. 4, initially, when the cover plate 112 having the twisted shape is placed onto the base member 111, some corners of the cover plate 112 are separated a predetermined distance, (i.e., the twisted height H), from the base member 111. Subsequently, the cover plate 112 is secured to the upper portion of the base member 111 by using a plurality of screws 119. The plurality of screws 119 comprises an example securing unit for securing the body of the cover plate 112 to the base member 111. However, the present invention may be practiced with any other mechanisms for securing the body of the cover plate 112 to the base member 111.

In FIG. 5, the cover plate 112 is un-warped back into substantially a flat shape by the securing force of the screws 119 after the assembly, and the whole edge portion closely contacts the base member 111. Thus, a pre-load tension is formed across the body of the cover plate 112 due to such un-warping of the cover plate 112. The pre-load tension formed across the cover plate 112 is approximately proportional to the amount of un-warping of the cover plate 112 (and thus to the twisted height H in FIG. 3). Thus, the level of the pre-load tension across the cover plate 112 is significantly increased from the prior art.

Note that the pre-load tension formed across the cover plate 112 in this manner is a physical characteristic of the cover plate 112 that may be measured. Generally, equipment for measuring tension (i.e., for stress/tension mapping) across a surface is known to one of ordinary skill in the art.

Figure 6:
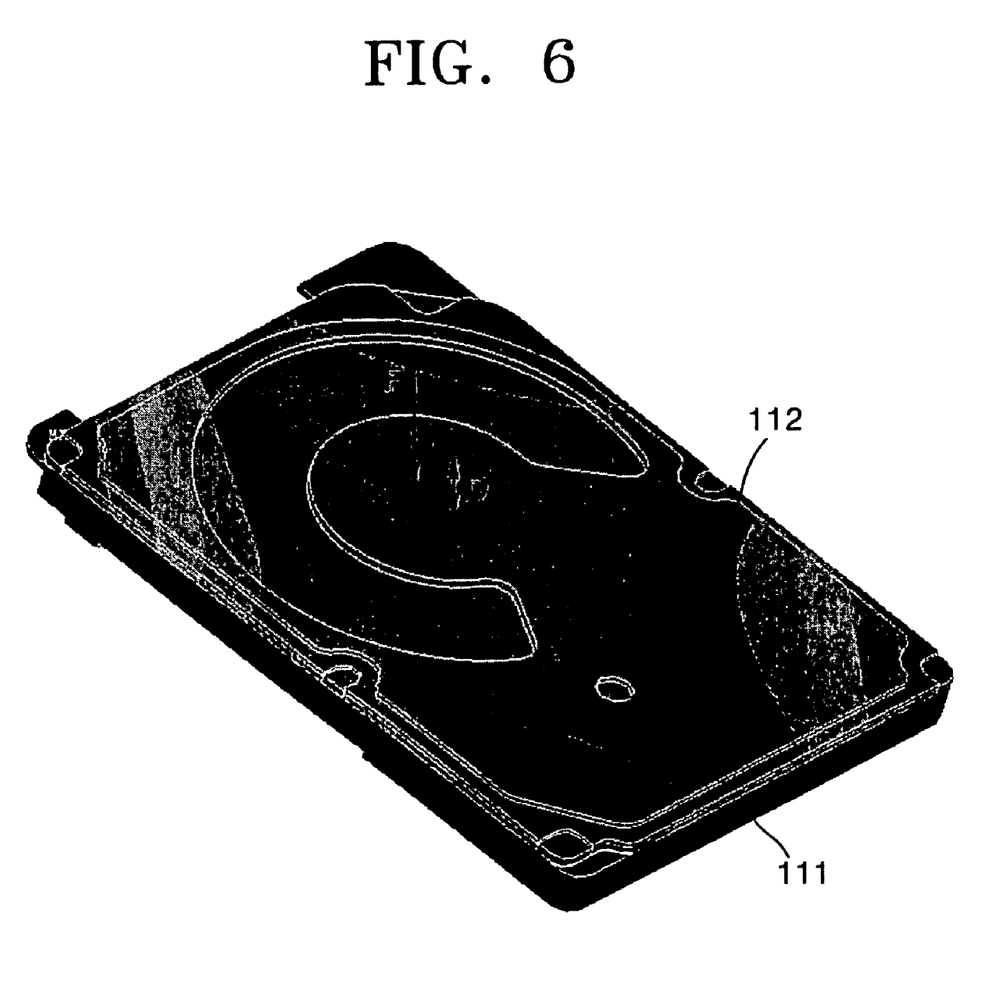
FIG. 6 illustrates a simulation result indicating minimization of vertical displacement for the cover plate of FIG. 5, according to an embodiment of the present invention.

FIG. 6 illustrates the result of simulation for indicating a change in the vertical displacement of the cover plate 112 assembled to the base member 111 of the disk drive, according to an embodiment of the present invention. FIG. 6 indicates that after the cover plate 112 is completely assembled to the base member 111, the displacement of the cover plate 112 in the vertical direction, (i.e., the out-of-plane displacement), gradually increases toward the corner portions.

Referring to FIG. 6, when an external load F is applied to a center portion of the cover plate 112, the result of measurement of a displacement D of the cover plate 112 at a point where the load F is applied is shown in Table 1. In Table 1, a displacement D is listed for each of a plurality of cover plates 112 formed with various twisted heights H. Further in Table 1, the displacement D is expressed in percentage of the displacement for a cover plated having a flat shape (i.e., the twisted height H=0 mm). The size and thickness of the cover plate 112 used for Table 1 are 70×90 mm and 0.4 mm.

TABLE 1

| Twisted Height of Cover Plate (H) | Displacement at a point where an external load is applied (D) |
|---|---|
| 0 mm | 100% |
| 5 mm | 99% |
| 10 mm | 73% |
| 15 mm | 47% |

Table 1 shows that the displacement D decreases as the twisted height H of the cover plate increases. This signifies that the pre-load tension formed across the cover plate after assembly increases as the twisted height H of the cover plate increases. In particular, when the twisted height H of the cover plate is over 10 mm, the effect of the pre-load tension formed across the cover plate remarkably decreases the displacement D.

The twisted height H may be adjusted for achieving a desired level of preload tension across the body of the cover plate 112. The twisted height H corresponding to a sufficient pre-load tension may differ according to the size and thickness of the cover plate 112. The twisted height H is determined for obtaining a displacement D less than a predetermined limit depending on the size and thickness of the cover plate.

In this manner, the stiffness of the cover plate 112 increases with the level of pre-load tension formed across the cover plate 112. Thus, the displacement of such a cover plate 112 from external impact or load decreases due to the increased stiffness. With such decreased displacement, the cover plate 112 has less probability of contacting disk drive components, even with reduced dimensions of the disk drive.

Table 2 shows the natural frequency of the cover plate 112 for various twisted heights H in percentage of the natural frequency of the conventional flat cover plate (having twisted height H=0 mm). The size and thickness of the cover plate 112 used for Table 2 are 70×90 mm and 0.4 mm.

TABLE 2

| Twisted Height of Cover Plate (H) | Natural Frequency of Cover Plate |
|---|---|
| 0 mm | 100% |
| 5 mm | 113% |
| 10 mm | 122% |
| 15 mm | 129% |

In Table 2, the natural frequency of the cover plate 112 gradually increases as the twisted height H of the cover plate 112 increases. Such an effect results from increased pre-load tension across the cover plate 112 resulting in higher stiffness of the cover plate 112, for each increase to the twisted height H.

With sufficient stiffness of the cover plate 112, the natural frequency of the cover plate 112 may be increased to be out of the audio frequency range, thus lowering noise emanating from the disk drive. In addition, as the stiffness of the cover plate increases, vibrations of the cover plate and the disk facing the cover plate are reduced.

Figure 7:
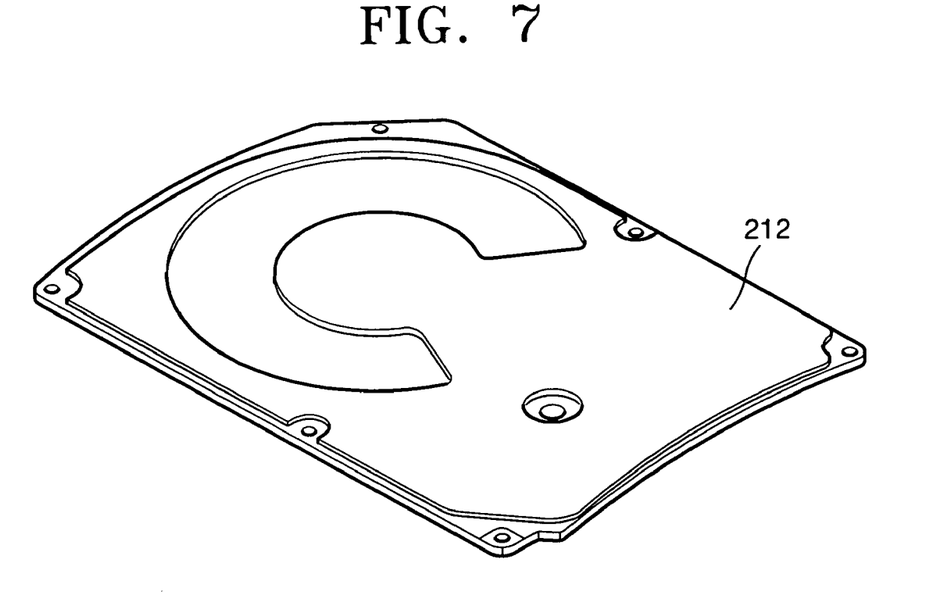
FIGS. 7 and 8 show perspective views of alternative warped shapes of cover plates before being secured to the base member of the disk drive, according to other embodiments of the present invention.
Figure 8:
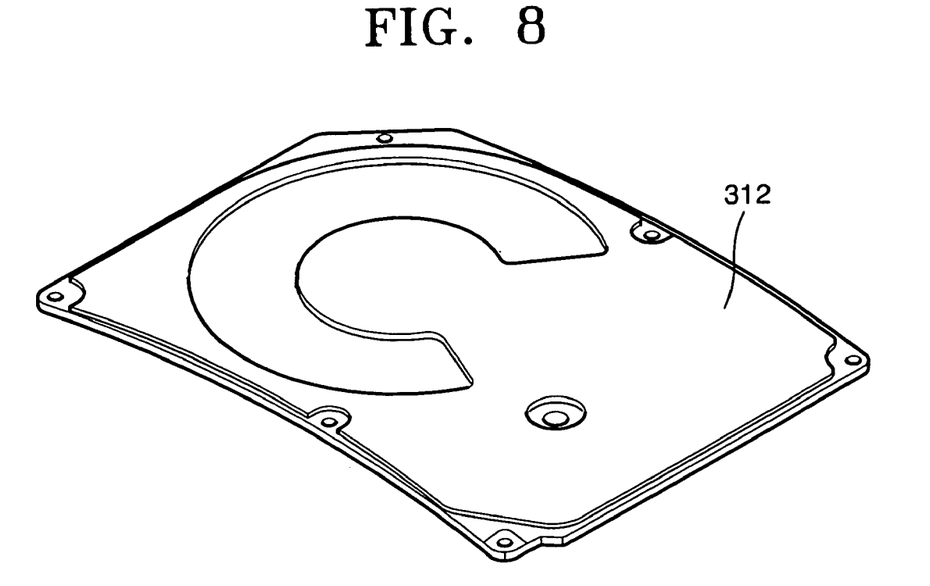

FIGS. 7 and 8 show perspective views of cover plates 212 and 312 according to alternative embodiments of the present invention. Referring to FIG. 7, the cover plate 212 before being assembled to the base member 111 of the disk drive warps in the widthwise direction. Referring to FIG. 8, the cover plate 312 before being assembled to the base member 111 of the disk drive warps in the lengthwise direction. The level of warping of the cover plates 212 and 312 is adjusted for achieving sufficient stiffness depending on the size and thickness of the cover plates 212 and 312. The cover plates 212 and 312 may be manufactured according the manufacturing methods described herein for the cover plate 112.

The warped cover plates 212 and 312 are each secured to a respective base member of a respective disk drive so as to become substantially un-warped from the securing force, similarly as described for the cover plate 112. Such a securing force results in pre-load tension formed across the body of each of the cover plates 212 and 312 for increased stiffness of the cover plates 212 and 312, similarly as described for the cover plate 112.

In this manner, the preload tension formed across the cover plate 112, 212, or 312, increases the stiffness of the cover plate secured to the base member 111 of the disk drive. Thus, such a cover plate is not easily deformed, to more effectively protect the enclosed disk drive components, even when the cover plate is relatively thin and even with reduced dimensions of the disk drive. In addition, the cover plate 112, 212, or 312 with higher stiffness more effectively minimizes propagation of noise from the disk drive.

The foregoing is by way of example only and is not intended to be limiting. For example, the present invention is described for example warped shapes of the cover plate 112, 212, or 312. However, the present invention may also be practiced with other warped shapes of the cover plate before the cover plate is secured to the base member of the disk drive. In addition, the individual components illustrated and described herein for embodiments of the present invention are by way of example only. For example, the present invention may be practiced for a cover plate installed within any types of disk drives aside from the example of a HDD (hard disk drive). In addition, the cover plate may be secured to the base member of the disk drive using any other types of mechanisms aside from the screws 119.

While this invention has been particularly shown and described with reference to example embodiments thereof, it will be understood by those skilled in the art that various changes in form and details may be made therein without departing from the spirit and scope of the invention as defined by the appended claims.

What is claimed is:

1. A cover plate of a disk drive, comprising:
    a body having preload tension across the body; and
    a securing unit for securing the body of the cover plate to a base member of the disk drive,
    wherein the preload tension is formed after the body of the cover plate that was warped is secured to the base member to become un-warped;
    and wherein the cover plate has a twisted shape before being secured to the base member.

2. The cover plate of claim 1, wherein a twisted height of the cover plate before being secured to the base member determines a level of the preload tension formed across the cover plate.

3. The cover plate of claim 1, wherein the cover plate warps in one direction before being secured to the base member.

4. The cover plate of claim 1, wherein the securing unit includes a plurality of screws.

5. A disk drive, comprising:
    a base member; and
    a cover plate secured to the base member with preload tension formed across the cover plate after the cover plate that was warped is secured to the base member to become un-warped;
    wherein the cover plate has a twisted shape before being secured to the base member.

6. The disk drive of claim 5, wherein a twisted height of the cover plate before being secured to the base member determines a level of the preload tension formed across the cover plate.

7. The disk drive of claim 5, wherein the cover plate has a substantially flat shape after being secured to the base member.

8. The disk drive of claim 5, wherein the cover plate warps in one direction before being secured to the base member.

9. The disk drive of claim 5, further comprising:
    a plurality of screws for securing the cover plate to the base member.

10. A method for forming a disk drive, comprising:
    forming a cover plate to have a warped shaped; and
    securing the cover plate to a base member with preload tension formed across the cover plate after the cover plate that was warped is secured to the base member to become un-warped;
    wherein the cover plate has a twisted shape before being secured to the base member.

11. The method of claim 10, wherein a twisted height of the cover plate before being secured to the base member determines a level of the preload tension formed across the cover plate.

12. The method of claim 10, wherein the cover plate has a substantially flat shape after being secured to the base member.

13. The method of claim 10, wherein the cover plate is warped in one direction before being secured to the base member.

14. The method of claim 10, wherein forming the cover plate to have the warped shaped includes:
    forming the cover plate with a flat shape by press-processing a metal plate; and
    plastically deforming the metal plate to the warped shape.

15. The method of claim 10, wherein forming the cover plate to have the warped shaped includes:
    press-processing a metal plate to form the cover plate with the warped shape.

16. The method of claim 10, wherein the cover plate is secured to the base member with a plurality of screws.

* * * * *